United States Patent [19]

Dettling et al.

[11] 4,335,023

[45] Jun. 15, 1982

[54] MONOLITHIC CATALYST MEMBER AND SUPPORT THEREFOR

[75] Inventors: Joseph C. Dettling, Jackson; John J. Mooney, Wyckoff; Robert M. Skomoroski, Paterson; Saul G. Hindin, Mendham, all of N.J.

[73] Assignee: Engelhard Corporation, Iselin, N.J.

[21] Appl. No.: 114,807

[22] Filed: Jan. 24, 1980

[51] Int. Cl.$^3$ .................. B01J 21/04; B01J 23/40; B01J 35/04

[52] U.S. Cl. .................. 252/466 PT; 252/455 R; 252/457; 252/463; 252/466 B; 252/477 R

[58] Field of Search ............... 252/477 R, 455 R, 457, 252/463, 466 PT, 466 B; 422/177, 180; 428/188

[56] References Cited

U.S. PATENT DOCUMENTS

| | | | |
|---|---|---|---|
| 3,441,381 | 4/1969 | Keith et al. | 422/180 |
| 3,565,830 | 2/1971 | Keith et al. | 252/477 R |
| 3,910,770 | 10/1975 | Kobylinski et al. | 252/477 R |
| 4,102,980 | 7/1978 | Sasaki et al. | 252/411 R |
| 4,189,404 | 2/1980 | Keith et al. | 252/477 R |

Primary Examiner—W. J. Shine
Attorney, Agent, or Firm—V. E. Libert

[57] ABSTRACT

A catalytic promoting material is supported on a monolithic support member, of the type generally referred to as a "honeycomb" support, having longitudinal fluid flow channels extending through it. The catalytically promoting material is dispersed as a coating on the walls of the fluid flow channels which are nominally polygonal, preferably nominally square, in cross section profile so that the walls forming the flow channels can be made as thin as possible consistent with an acceptable thermal and mechanical strength. However, the juncture of the channel walls forming the flow channels are filleted to provide a concave profile, preferably one having an arcuate shape in cross section, so that the corners are "filleted" or "rounded", to subtend an appreciable segment of the nominal width of the channel wall. This prevents or at least reduces the accumulation of excess catalytic material which occurs in the sharp angular corners of prior art structures.

32 Claims, 8 Drawing Figures

MONOLITHIC CATALYST MEMBER AND SUPPORT THEREFOR

BACKGROUND OF THE INVENTION

The present invention relates to catalysts of the type wherein a catalytically promoting component is distended upon a monolithic support member having a plurality of fluid flow channels extending through it. The catalytically promoting component is disposed on the walls of the fluid flow channels so that a fluid such as a gas flowing therethrough comes into contact with the catalytically promoting material. The present invention is particularly adapted to provide a support suitable for the treatment of automotive exhaust gases, although it will be appreciated that it is not necessarily limited thereto but is generally suitable for catalytic contacting of fluids, such as, for example, catalytic treatment of gases including pollution abatement, catalytic processing, and catalytic combustion of fuels.

Monolithic support members having a plurality of fluid flow passages therethrough are, of course, well known in the art. For example, see U.S. Pat. Nos. 3,441,381 and 3,565,830, both assigned to the assignee of this application, the disclosures of which include catalyst carrier members of the type generally referred to as monolithic or honeycomb members. These carriers comprise inert, solid unitary or monolithic skeletal bodies having a plurality of unobstructed fluid flow channels formed therein and extending therethrough in the intended direction of fluid flow through the carrier. The carriers are preferably formed of a substantially chemically inert, generally catalytically inactive, rigid solid material. The material is sufficiently refractory to maintain its shape and sufficient mechanical strength at temperatures on the order of up to 1100° C. or more so as to enable use of the carriers in the treatment of automotive exhaust gases or other high temperature applications. The fluid flow channels are disposed generally parallel to each other and extend through the carrier from one to the other opposite end faces thereof, the fluid flow channels being defined and separated from each other by a plurality of channel walls.

Generally, in order to minimize pressure drop sustained by fluids passed through the flow channels, it is desired to have a maximum amount of open fluid flow area in the end faces. To this end, the walls of the fluid flow channels are usually formed as thin as is feasible consistent with a degree of mechanical strength and integrity under thermal stress sufficient for the contemplated use. Refractory materials generally suitable to form such a carrier are materials such as zircon-mullite, alpha alumina, sillimanite, magnesium silicates, zircon, petalite, spodumene, cordierite, alumino-silicates, mullite and the like. As indicated in the above-mentioned U.S. Pat. No. 3,565,830, the disclosure of which is incorporated by reference herein, for certain applications it is preferred or essential that the carrier be essentially crystalline in form and have considerable accessible porosity.

Generally, a preferred refractory carrier is a solid, unitary or monolithic skeletal body constructed of a substantially chemically inert, substantially catalytically-inactive, rigid, solid material which is unglazed and has considerable accessible porosity. The channel walls of the fluid-flow passages preferably contain macropores in communication with the flow channels to provide increased accessible catalyst surface when the carrier is coated with a catalytic material. The geometric surface area, including the surfaces of the fluid flow channels, of a typical monolithic carrier (assuming a smooth, nonporous surface) may be on the order of 0.001 to 0.01 square meters per gram. However, the actual surface area of the carrier, taking into account the porosity of the carrier material is usually many times greater, eg., 50 to 150 or more square meters per gram, so that much of the catalytic reaction will take place within the large pores. Preferably, the skeletal structure has a macropore distribution such that over 95% of the pore volume is provided by pores of a diameter of over 2,000 Angstroms, and over 5% of the pore volume is provided by pores having a diameter of over 20,000 Angstroms. For example, in one preferred embodiment, over 20% of the pore volume is provided by pores having a diameter of over 20,000 Angstroms. The total surface area, including the pores of the carrier, is preferably about 0.08 to 6 square meters per gram, preferably about 0.2 to 2 square meters per gram.

It is known in the prior art, as shown by the above-mentioned U.S. Pat. No. 3,565,830 (e.g., column 7, line 72 to column 8, line 2 thereof) that the cross-sectional shape of the fluid flow channels can be in the shape of triangles, rectangles, squares, sinusoids, circles or other circular shapes, so that the cross sections of the support represent a repeating pattern of a lattice or honeycomb type structure. At column 8, line 2 to line 8 of the same patent, it is stated that cross sections with sharp, acute angled corners are not preferred as they can collect solids such as lead compounds from the gases and become plugged and/or catalytically inactive. It is further stated that the walls of the cellular channels are generally made of the minimum thickness necessary to provide a strong unitary body. Typical wall thicknesses are exemplified as ranging from about 2 to 25 mils.

U.S. Pat. No. 4,102,980 discloses a catalytic contact apparatus for the removal of harmful components from waste gases from stationary sources such as combustion furnaces, and shows in FIG. 8 thereof a cross section of one embodiment having substantially square cross section shaped gas flow channels. The drawing somewhat schematically indicates a slight rounded shape at the corners of the channels. The patent is silent with respect to the slightly rounded corners, which feature is believed to be a typical irregularity of manufacturing processes used to make such carriers as described in more detail below with respect to one of the prior art embodiments illustrated.

One difficulty with prior art structures which employ a round or oval cross section configuration of the fluid flow channels is that portions at least of the walls defining and separating the channels are necessarily thicker than the minimum required thickness of the wall which occurs at the closest spacing of the periphery of adjacent channels. Thus, the end face wall area is undesirably increased at the expense of the open fluid flow end face area provided by the gas flow channel openings. This problem can be avoided by employing flow channels of polygonal cross section, e.g., rectangular (including square), triangular or hexagonal cross section shaped flow channels. See, for example, FIG. 4 of U.S. Pat. No. 3,910,770. Cross sectional shapes such as rectangular or hexagonal can be arranged with a generally uniform minimum wall thickness between adjacent channels thereby avoiding an undesirable increase in end face wall area as opposed to end face open flow area. However, such flow channel polygonal cross section shapes have the disadvantage that they necessarily provide sharp angular corners which define in cross section either obtuse angles (octagonal cross section) right angles (rectangular cross sections) or acute angles (triangular cross sections). The angular corners present a problem when catalytic promoting materials and/or coatings to support the same are applied to the catalytic carriers. Significant amounts of the coating and catalytically promoting materials are found to accumulate in the sharp angular corners to a depth which tends to effectively prevent access of the treated fluid to the most deeply "buried" portions of the coating and catalyst in the corners. This renders a small but significant percentage of the coating and/or catalytic material inaccessible to the fluid to be treated, thereby resulting in a general inefficiency and waste. The problem is particularly acute in an economic sense when the catalytic promoting material is a precious metal because of the high cost of the wasted catalytic material. Further, the initial accumulations of the coating and/or catalytic material in the corners tends to cause the coating on the flat planar surfaces between the corners to be correspondingly thinner, therefore exposing a lesser amount of catalytic material to the fluid flow. Even if it were economically or technically feasible to continue to build up the thickness of the coating (it is not), the coating would still be deeper in the corners than on the flat surfaces intermediate adjacent corners. It is an object of the present invention to overcome the problems such as those described above.

SUMMARY OF THE INVENTION

Generally, in accordance with the present invention, an improved catalyst and improved catalyst carrier member is provided by a monolithic catalyst carrier whose gas flow channels have filleted corners, the fillets being of a size sufficient to eliminate or at least substantially reduce the accumulation of excess catalytic coating in the corners formed at the juncture of the channel walls. The fillet may have in cross section any suitable shape profile, such as flat planar or arcuate.

In accordance with the present invention, there is provided in a carrier member adapted to have a catalytic promoting material deposited as a coating thereon, and comprising a monolithic body having opposite end faces, a plurality of fluid flow channels extending through the body from one of said end faces to the other to provide fluid flow communication through the body, the channels being formed by channel walls dimensioned and configured to define along their length a nominally regular polygonal shaped cross section profile of the channels, the following improvement. The juncture of adjacent walls within the channels is formed by fillet portions of the walls, the fillet portions extending along the length of the channels and defining in cross section concave profiles of a depth sufficient to extend at least to the midpoint of a segment of a circle taken as disposed tangentially with respect to the two channel walls whose juncture is provided by the fillet, and which segment subtends between about 1.5% to 40% of the nominal width of each of the two channel walls adjacent to the juncture. Preferably, the imagined segment of a circle, i.e., an arc of a circle, is taken as one which subtends between about 5-25% of the nominal width of the two channel walls.

In accordance with one aspect of the invention, the fillet portions define in cross section arcuate profiles.

The arcuate profiles may have the shape of substantially circular segments with a radius of curvature of from four to twenty-five mils. Preferably, the arcuate profiles merge tangentially into the channel walls. The flow channels of the monolithic body have a nominally polygonal cross-section profile shape selected from the group consisting of isosceles triangles, equilateral triangles, rectangles and hexagons.

In accordance with another aspect of the invention, the improvement comprises that the channels are formed by channel walls dimensioned and configured so as to define along their length a central flat planar portion bounded on its opposite sides by fillet portions which form the juncture of adjacent walls within the channels, the fillet portions defining in cross section concave profiles large enough whereby when the body is coated with one or more of a refractory metal oxide precursor and a refractory metal oxide in particulate form deposited from an liquid preferably aqueous medium containing the same flowed through the channels and the monolithic body is heated to expel the liquid medium and to form a coating of the refractory metal oxide on the channel walls, the metal oxide coating is deposited to a substantially uniform average depth on both the flat planar and fillet portions of the walls.

In accordance with another aspect of the invention, the channel walls have a minimum thickness of about 0.1 millimeters and the member has about 2.5 to 186 channels per square centimeter (16 to 1200 channels per square inch) of end face surface area. A catalytically active component may be disposed on the channel walls in a layer having a thickness of from about 0.00254 to 0.127 millimeters (0.0001 to 0.005 inches) and may comprise a refractory metal oxide having one or more of a catalytically active metal thereon. The catalytically active component may comprise alumina as the refractory metal oxide and contain thereon one or more of a platinum group metal and, optionally, one or more of a base metal. Further, the channel walls may have, in a preferred embodiment, a nominal width of about 20 to 280 mils and the fillet portions subtend about five to forty percent of said nominal width, preferably about ten to twenty-five percent.

In accordance with another aspect of the invention, the fillet portions may be an integral part of the body formed as a unitary part thereof as distinguished from the case where the fillets are added to an existing body such as by the application of a precoating.

In accordance with another aspect of the invention, there is provided a method of making a catalytic member comprising the following steps. Forming, in a monolithic body having opposite end faces, a plurality of fluid flow channels extending through the body from one of the end faces to the other and being dimensioned and configured to define along their length a nominally regular polygonal shaped cross section profile of the channels, the juncture of adjacent walls within the channels being formed by fillet portions extending along the length of the channels and defining in cross section concave profiles which subtend a length of at least about four mils of, preferably, at least about eight mils, the nominal width of each of the two channel walls adjacent thereto. The concave profiles are of a depth sufficient to extend at least to the midpoint of a segment of a circle taken as disposed tangentially with respect to the two channel walls adjacent thereto. Contacting the body with a liquid medium, preferably an aqueous medium, containing one or more of a refractory metal oxide precursor and a refractory metal oxide in particulate form and depositing the same on the channel walls. Heating the body to expel the aqueous medium and form on the channel walls a coating of a refractory metal oxide having a substantially uniform average depth on both the fillet portions and the other portions of the channel walls.

In another aspect of the invention, the method includes forming the fillet portions so that they define arcuate profiles in cross section. The fillet portions may be formed so that they define in cross section profiles of substantially circular segments having a radius of curvature of from about four to twenty-five mils.

In one aspect, the method may include the step of forming in the monolithic body having opposite end faces, a plurality of fluid flow channels extending through said body from one of the end faces to the other and being dimensioned and configured to define along their length a central flat planar portion bounded on its opposite sides by fillet portions which form the juncture of adjacent walls within the channels and define in cross section concave profiles.

The method of the invention may include as part of the heating step, calcining at a temperature of between about 250° C. to 800° C. and may include either forming the fillet portions integrally with the body, or forming the fillets in a preliminary step by a precoating applied prior to the coating of the refractory metal oxide.

As used in this specification and in the claims, the terms "coating" and reference to a "refractory metal oxide" refer to the activated, high surface area metal oxide coating, such as gamma alumina, which carries the catalytically active metal components, and not to the relatively low surface area and catalytically inactive material (referred to as "precoating") such as alpha alumina. The "coating" or "refractory metal oxide" deposited on the carrier contains or will thereafter have deposited thereon catalytically promoting metal components such as one or more platinum group metals, base metals, and base metal oxides. The "precoating" is used, in accordance with one aspect of the invention, to form fillets in the corners of the carrier gas flow channels prior to deposition of the refractory metal oxide coating.

The monolithic body of the carrier member may be comprised of a material selected from the class consisting of zircon-mullite, alpha alumina, sillimanite, magnesium silicate, zircon, petalite, spodumene, cordierite, alumino-silicate and mullite.

DESCRIPTION OF THE PREFERRED EMBODIMENTS

Figure 1:
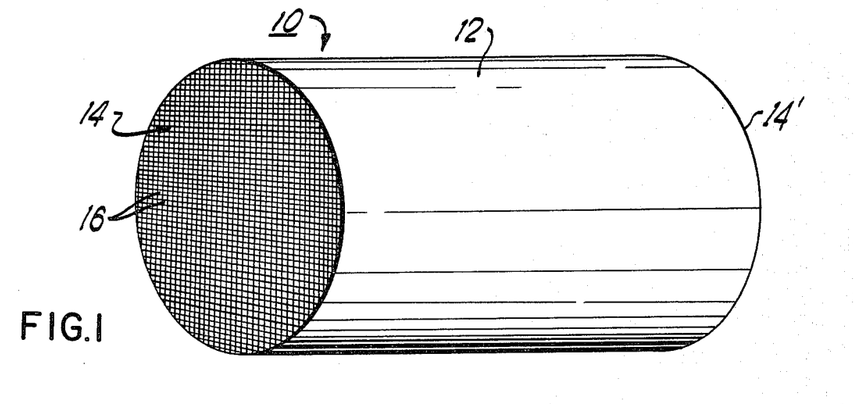
FIG. 1 is a perspective view of a monolithic catalyst carrier comprising one embodiment of the present invention.

FIG. 1 shows generally at 10 a catalyst carrier illustrating a preferred embodiment of the present invention. The carrier is seen to be monolithic and of generally cylindrical shape having a cylindrical outer surface 12, one end face 14 and an opposite end face, not visible in FIG. 1, which is identical to end face 14. The juncture of outer surface 12 with the opposite end face at its peripheral edge portion is indicated at 14' in FIG. 1. Carrier 10 has a plurality of fluid flow channels formed therein and, since a preferred embodiment of the present invention is adapted for the treatment of engine exhaust gases, these channels are referred to as gas flow channels 16, better seen in enlarged FIG. 1A. Gas flow channels 16 are formed by channel walls 18. Gas flow channels 18 extend through carrier 10 from end face 14 to the opposite end face thereof, the channels being unobstructed so as to permit the flow of a fluid, e.g., a gas, longitudinally through carrier 10 via gas flow channels 16 thereof. As will be seen from FIGS. 1A and 1C, channel walls 18 are so dimensioned and configured that gas flow channels 16 have a substantially regular polygonal shape, square in the illustrated embodiment, except for fillet portions 20 which, in the illustrated embodiment, define in profile arcuate concave sections and comprise the juncture of adjacent ones of walls 18.

Figure 1A:
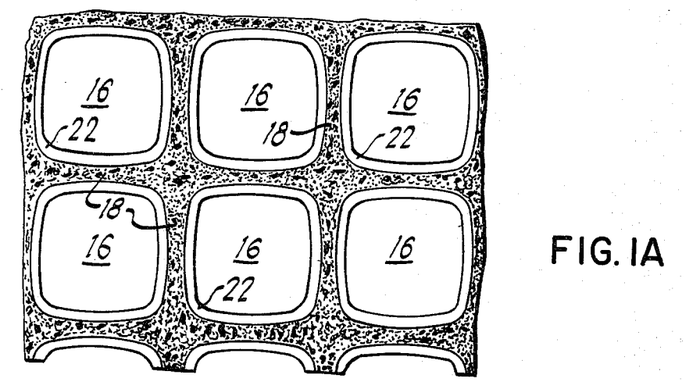
FIG. 1A is a partial cross-sectional view on an enlarged scale taken along a plane parallel to the end faces of the carrier of FIG. 1.
Figure 1B:
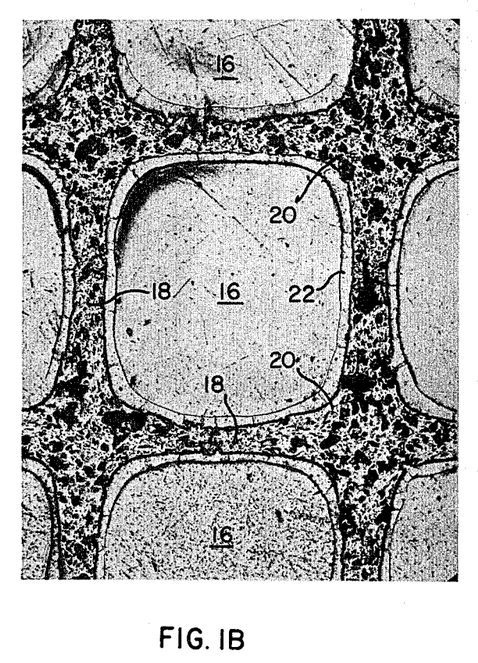
FIG. 1B is a photomicrograph at 50× magnification of an embodiment of the present invention, the photograph of FIG. 1B being a cross-sectional view corresponding to that shown in the drawing of FIG. 1A.
Figure 1C:
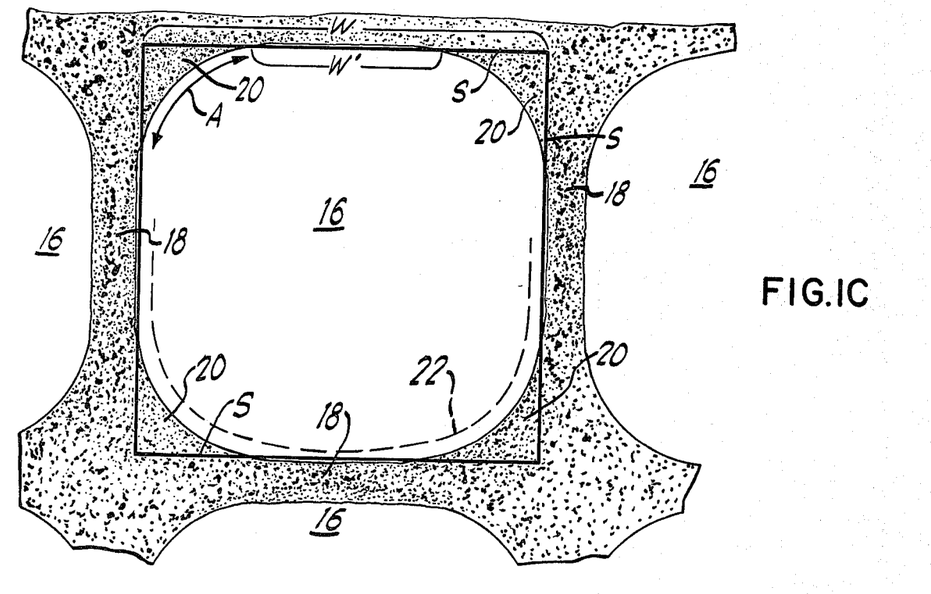
FIG. 1C is a view on a further enlarged scale of one of the fluid flow channels of the drawing of FIG. 1A.

As shown in FIG. 1C, the width in cross section of channels 16 is indicated by W, the width in cross section of any side of the geometric square figure S superimposed on the cross sectional view of gas channel 16. Each side of the square figure S defines the nominal width W in cross section of the regular polygon approximated by the cross section profile of gas channel 16. The width W corresponds to the straight line distance extending perpendicularly from the substantially flat planar midportion of one channel wall 18 to that of an opposite wall 18. The term "nominal width" channel walls is used in the claims to have the meaning illustrated herein, i.e., the width in cross section of one side of the polygon defined by the channel cross section profile if the filleted corners are ignored (or are nonexistant, as may be the case when the term is used with reference to prior art structures). W would correspond to the actual physical width in cross section of the walls 18 if concave portions 20 were eliminated, in which case the cross section profiles would be substantially geometrically perfect squares. The arcuate surface length of fillet portions 20 is geometrically indicated in FIG. 1C by arc A, and the width in cross section of the substantially planar central portion of channel walls 18 is indicated by W'. It should be noted that the concave juncture provided by fillet portions 20 and the adjacent walls 18 could also be provided if fillet portion 20 were flat, i.e., defined in cross section a straight, rather than arcuate profile. So long as it is appropriately sized, a flat fillet portion would also provide a suitable concave juncture. However, arcuate concave profiles are preferable because they provide a generally smooth profile. As used in this specification and claims, "arcuate" is intended to include not only a smooth, curved configuration but also a series of straight line segments disposed in generally arcuate alignment.

It is a well known expedient in the art to apply a coating to catalyst carriers 10 to provide a high surface area support for the deposition of the catalytically promoting material. For example, a coating 22 (shown in FIG. 1A) of a refractory metal oxide is usually provided as a support for the catalytically promoting material. One expedient which is particularly useful in the preparation of catalytic materials for the purification of automotive engine exhaust gases, is to provide a film or coating of a catalytically active form of alumina or of such alumina stabilized with a minor proportion, say from 2 to 10 percent by weight, of a stabilizing material such as a rare earth oxide. The catalytically active metal oxide is deposited on the surfaces of the unitary monolithic carrier as a more or less continuous thin deposit which usually has a thickness of from about 0.00254 to 0.127 mm (about 0.0001 to 0.005 inches). The refractory metal oxide coating is characterized by a porous structure which possesses a large internal pore volume and high total surface area. Generally, the total surface area of the active refractory metal oxide film would be at least about 25 square meters per gram and preferably at least about 100 square meters per gram of the metal oxide. The catalytically promoting material, such as for example, platinum alone or in admixture with one or more other platinum group metals and optionally containing base metal oxides such as, for example, nickel oxide, is deposited upon or impregnated into the refractory metal oxide film. The deposition of coating 22 is indicated in dot dash lines in FIG. 1C only on the lower half of gas flow channel 16, for clarity of illustration. It will be appreciated that such coating is normally deposited substantially over the entire surfaces of each of gas channels 16 as is shown in FIG. 1A.

FIG. 1B is a photomicrograph showing in cross section a catalyst carrier 10 in accordance with the invention having a plurality of fluid flow channels 16 formed therein by walls 18 of generally regular polygonal (square) cross section except that the juncture of adjacent walls 18 is formed by a fillet comprising in this instance concave portion 20 having an arcuate profile in cross section. A coating 22 of catalytically promoting material disposed on a refractory metallic oxide support is disposed on the surfaces of carrier 10 including the walls of gas flow channels 16 thereof.

Figure 2:
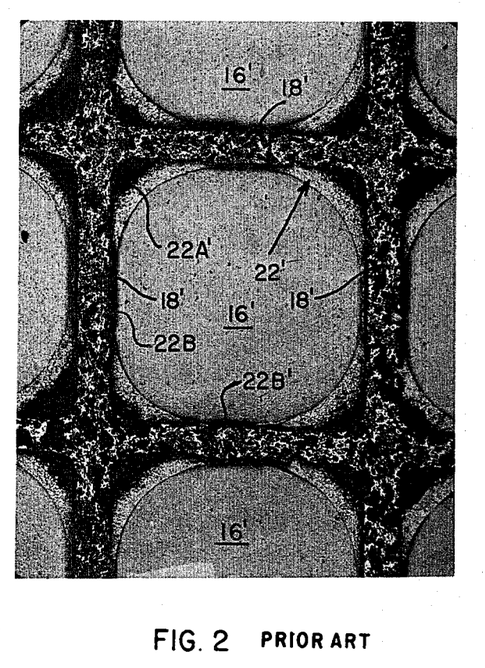
FIG. 2 is a photomicrograph at 50× magnification, corresponding to that of FIG. 1B but showing a prior art embodiment.

FIG. 2 shows a comparable photomicrograph of a prior art embodiment in which a plurality of gas flow channels 16' are formed by channel walls 18', channel walls 18' being dimensioned and configured to provide a regular polygonal, in this case square, i.e., rectangular, configuration to gas flow channels 16' (as used in this specification and in the claims, the term "rectangle" is deemed to include the special case of a square). It will be noted that a very small arcuate shaped irregularity exists in the corners formed by channel walls 18'. This irregularity is reminiscent of the illustration set forth in FIG. 8 of U.S. Pat. No. 4,102,980, mentioned above, and appears to be quite small as compared to the approximately 43 mil channel wall nominal width. The irregularities are probably caused by wear of the dies used in forming the carriers. As shown by the photomicrograph, this arcuate irregularity is insignificant in the sense that it is so small that it does not avoid or substantially reduce the excessive thickness of coating 22 in the corners, as more fully described below.

Figure 3:
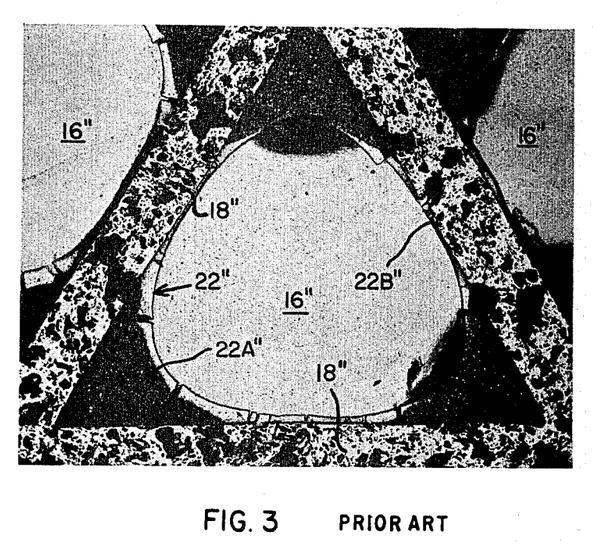
FIG. 3 is a photomicrograph of 50× magnification, corresponding to that of FIG. 1B but showing another prior art embodiment.

FIG. 3 shows another prior art embodiment in a photomicrograph in which a triangular configuration of gas flow channels 16" is provided by channel walls 18".

Figure 4:
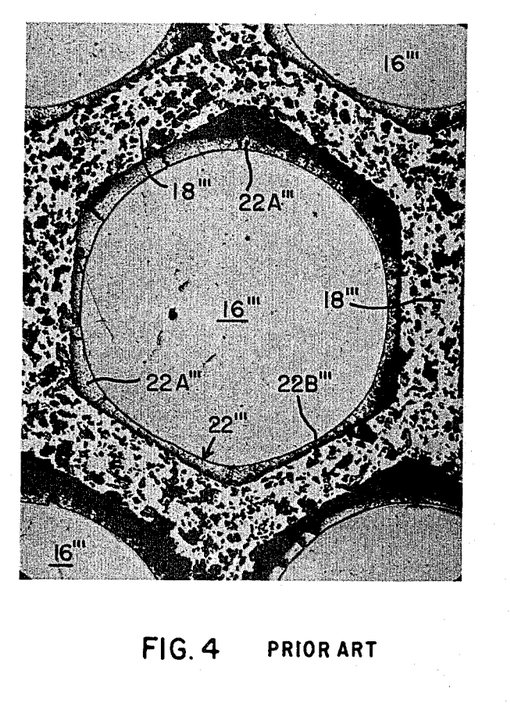
FIG. 4 is a photomicrograph at 50× magnification corresponding to that of FIG. 1B but showing yet another prior art embodiment.

FIG. 4 shows yet another prior art embodiment in a photomicrograph in which channel walls 18''' are dimensioned and configured to provide a hexagonal cross section configuration to gas flow channel 16'''.

The embodiment of the present invention illustrated in the photomicrograph of FIG. 1B, and the prior art embodiments illustrated in the photomicrographs of FIGS. 2, 3 and 4, each consist of a substrate comprising cordierite, which is an alumina magnesia silicate material. The specimens of FIGS. 2 and 4 were manufactured by NGK Insulators, Ltd. of Nagoya, Japan and the specimen of FIG. 3 was manufactured by Corning Glass Works, Inc., of Corning, N.Y.

The specimens photographed were taken from carrier members, each of which was coated by an identical process as described in more detail below, to deposit a coating thereon of a catalytically promoting material supported on alumina. This provided a catalyst member useful for three way conversion of pollutants in a gas stream. These catalyst members were tested and the results of the test are described below.

As will be observed by a comparison of FIG. 1B with FIGS. 2, 3 and 4, coating 22 of FIG. 1B is disposed over the surfaces of channel walls 18 in a substantially uniform depth. In contrast, the coatings 22' of the square cross sectional gas channel of FIG. 2 are seen to have a greatly increased depth at 22A' in the substantially right angle corner areas defined by the juncture of walls 18'. The innermost portions of these corner areas will be relatively inaccessible to gas or other fluid flowing through gas flow channel 16'. It will also be noted that coatings 22' of FIG. 2 are quite thin and almost disappear at the cross sectional center portions 22B' of channel walls 18'. This is apparently caused by an accumulation of coating material initially deposited at the center portions into the corners to form therein deep "pockets" of coating 22'.

In FIG. 3 this effect is seen to be even more pronounced. Coating 22" has accumulated into extremely thick pockets 22A" in the acute angled corners of the triangular gas flow channels 16", and is extremely thin at the cross sectional center portions 22B" of the planar walls 18".

With reference to FIG. 4, it is seen that the obtuse angles formed at the junctures of channel walls 18''' also tend to gather coating in relatively thick pockets as indicated at 22A''' with correspondingly thin portions occurring at some of the cross sectional center portions midpoint between adjacent junctures, as indicated at 22B'.

It will be noted that generally, the more acute the angle which is formed by the juncture of adjacent walls, the more aggravated is the problem of the formation of excessively thick or deep pockets of coating material in the corners formed by the juncture. Thus, the triangular configuration of FIG. 3 provides the most aggravated condition, the hexagonal configuration of FIG. 4 provides the least aggravated of the prior art conditions, and the right angle configuration of FIG. 2 provides an intermediate situation. It will be noted that none of the coatings on the prior art structures displays the general uniformity of depth and distribution along the entire periphery formed by the inner surfaces of channel walls 18 as is provided by the preferred embodiment of the invention illustrated in the photomicrograph of FIG. 1B.

Figure 5:
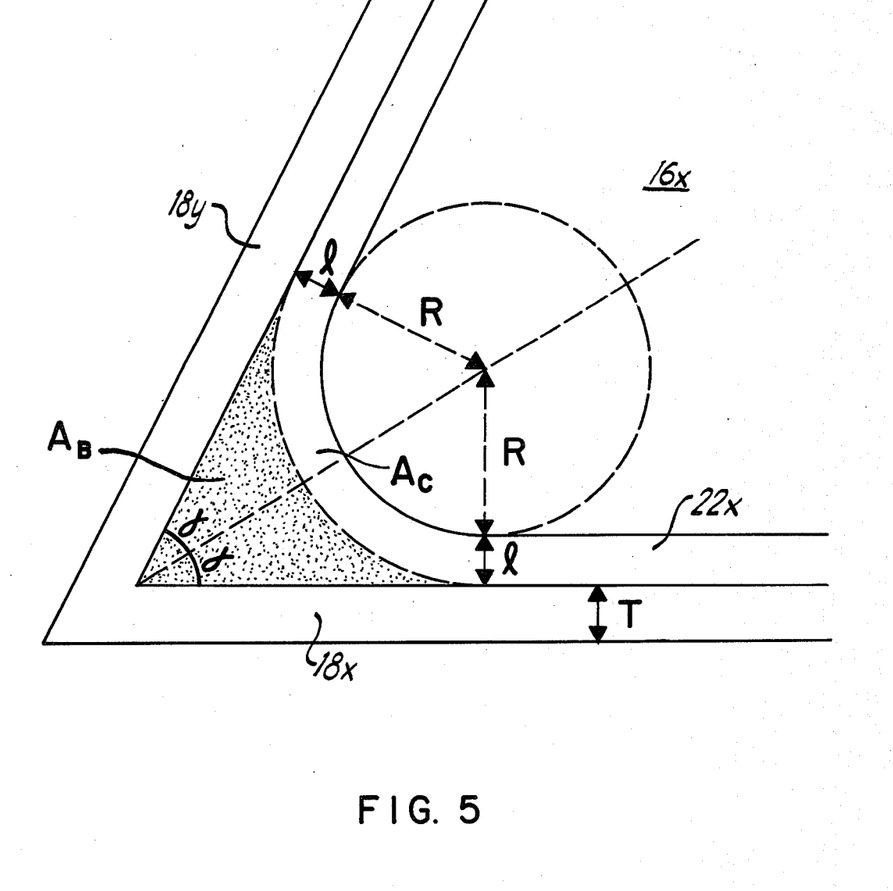
FIG. 5 is a schematic rendition showing the juncture of adjacent channel walls of a typical fluid flow channel and indicating the geometrical relationship between the angle of juncture of adjacent walls and the depth of the coating deposited thereon.

The above described photomicrographs corroborate a theoretical analysis and calculation based on the general case of a fluid flow channel of polygonal cross section illustrated by the schematic illustration of FIG. 5. FIG. 5 represents in cross section the juncture of a pair of channel walls 18X, 18Y which meet to define an angle therebetween of $2\alpha$. An activated coating 22X is deposited on the interior surfaces of walls 18X and 18Y. Walls 18X and 18Y have a minimum thickness T and, together with other channel walls not shown, cooperate to define a gas flow channel 16X.

The average depth of coating 22X at areas remote from the pocket of increased depth formed at the juncture of walls 18X and 18Y is indicated by l. This depth l is the depth of coating which is readily accessible to gases flowing through gas channel 16X. R indicates the radius of curvature of the surface of the coating at the juncture pocket.

The stippled portion $A_B$ of coating 22X in the juncture corner indicates material which is not readily accessible, by virtue of its depth in excess of the depth l, to gases flowing through gas channel 16X. The cross sectional area of the excess or "buried" activated coating (the stippled portion $A_B$ in FIG. 5) for the general case of a polygonal cell (e.g., square, triangular, rectangular or hexagonal) may be calculated by the following equation:

$$A_B = (R+l)^2 [\cot \alpha - (90-\alpha)\pi/180] \quad (1)$$

where $2\alpha$ is the angle (degrees) of the corner, R is the radius of curvature of the activated coating surface in the corner, and l is the average coating thickness along the cell walls equidistant from the corners. This relation was derived by subtracting the area of a sector $(180-2\alpha)°$ of a circle of radius $(R+l)$ from the area of the rhombus formed by the two radii $(R+l)$ and the portions of cell walls 18y and 18x subtended by the two radii, as shown in FIG. 5. The cross-sectional area, $A_B$, may be converted to activated coating volume by multiplying it by unit length along the gas flow channel. The "buried" coating $A_B$ in cell corners may be expressed as a percent, E, of the total coating in a cell by a calculation, as follows:

$$E = 100 \, A_B/A_T \quad (2)$$

where $A_T$ is the total cross-sectional area of coating in the channels, calculated as above. Specific values of E for the three types of cells photographed in FIGS. 2, 3 and 4 are listed in Table I.

TABLE A

CALCULATED EXCESS COATING IN CELL CORNERS EXPRESSED AS PERCENT OF TOTAL COATING IN CELL

| Cell Geometry Cells/In² | Coating Thickness (l) In. | Coating Radius of Curvature (R) In. | Total Coating In Corners, % of Total | Excess Coating In Corners, (E) % of total | 2α |
|---|---|---|---|---|---|
| Square 300 Equilateral | 0.001 | 0.0168 | 88 | 63 | 90° |

TABLE A-continued

CALCULATED EXCESS COATING IN CELL CORNERS EXPRESSED AS PERCENT OF TOTAL COATING IN CELL

| Cell Geometry Cells/In² | Coating Thickness (l) In. | Coating Radius of Curvature (R) In. | Total Coating In Corners, % of Total | Excess Coating In Corners, (E) % of total | 2α |
|---|---|---|---|---|---|
| Triangle 230 | 0.0006 | 0.0173 | 95 | 86 | 60° |
| Hexagon 300 | 0.002 | 0.0203 | 89 | 33 | 120° |

The area $A_C$ in FIG. 5 is the cross sectional area of coating 22 in the corner or juncture area. The total cross sectional area of coating 22 in the juncture of corner area (defined as the area bounded by the above-mentioned rhombus formed by the two radii $(R+l)$ of FIG. 5 and the cell portions subtended by the radii) is $A_B$ plus $A_C$. $A_T$ is the sum of $A_B$ plus $A_C$ for each corner of a cell plus l times the remaining (non-corner area) periphery of the cell walls.

The amount of activated coating accumulated in the channel varies with the geometry of the cross section opening of the cells. The amount of coating 22 accumulated in the corner areas of a cell is equal to $(A_B + A_C)$ times the number of corners. These quantities, expressed as a percentage of the total coating area, $A_T$, for the cell, calculated as above, are shown in Table A ("Total Coating in Corners") and are based on the average activated coating thickness and radii of curvature as listed in Table A. The amount of activated coating $A_B$ "buried" in the corners at a depth below the average thickness of coating 22 outside the area of the corners is shown by equation (1) to be a function of the angle $2\alpha$ defined by adjacent channel walls, and increases as $2\alpha$ become more acute. The thus "buried" coating is less accessible to gases flowed through gas flow channels 16 than the balance of the coating and, under certain conditions, the "buried" coating may be substantially ineffective in treating the gases.

The present invention provides fillet portions to occupy corners of the channels to fill in at least a substantial portion and, preferably, all of the area which, in the prior art embodiments, would be occupied by "buried" coating (area $A_B$ in FIG. 5).

Thus, the fillet portions should have a depth sufficient to at least reach the midpoint of the circular segment of radius $R+l$. As shown in FIG. 5, this circular segment defines the border between $A_B$ and $A_C$. The fillet portions need not be entirely coincident with the circular segment, e.g., the fillet portion may, in profile, be an arcuate circular or non-circular segment, or flat or stepped in flat and/or arcuate segments.

One effect of thus "filleting" the corners is to decrease the open fluid flow areas and thereby increase the monolith carrier bulk density as compared to carriers having non-filled polygonal shaped cross section channels. However, the increase is very small as compared to that which would be incurred by using channels of circular or oval cross section to eliminate sharp angled corners, because of the much thicker wall sections inevitably resulting between circular or oval cross section channels.

In any case, the disadvantages of the slight, although not insignificant, increase in bulk density and the slight, although not insignificant, reduction in open flow area caused by filleting the corners in accordance with the present invention are more than compensated for by the resulting more efficient use of catalytic promoting material.

The specimens of FIGS. 1B and 2 are monolithic carrier members having 400 cells per square inch of end face area and a wall thickness of about 6 mils. The nominal width, i.e., the distance across the channel measured perpendicularly to the generally flat planar portions of the channel walls, is about 43 mils. The radius of curvature of the circular segment arcuate fillet portions in the embodiment of FIG. 1B measure 8 mils and are positioned tangentially to the walls 18 of the cell, so that the fillets subtend about 8 mils of the 43 mil nominal width of the channel walls 18. The subtended portion thus comprises about 18.6% of the nominal width of the channel wall.

Carrier members having 400 gas flow channels per square inch of end face are conventionally employed in applications such as the treatment of automotive exhaust gases to reduce the amount of pollutants therein. Obviously, carrier members having differently sized gas flow channels are used in this and other applications. For example, relatively large size gas flow channels are employed for certain applications, e.g., carrier members having 9 or 16 gas flow channels per square inch of end face surface area are known. Such carrier members may have a channel wall thickness of about 50 mils or more and a nominal width of the channel walls of about 280 mils. For example, a 16 channel per square inch (2.48 channels per square centimeter) monolithic carrier made of a porous ceramic material by Corning Glass Works has square cells of about 211 mils (5.36 mm) nominal width and a wall thickness of about 39 mils. A nine channel per square inch (1.395 channels per square centimeter) carrier made by the same company has square cells of a nominal width of about 281 mils (7.144 mm) and a wall thickness of about 51 mils (1.290 mm). Generally, the wall thickness decreases with increasing number of gas flow channels per square unit of end face area, and the walls are made as thin as possible to maximize the open gas flow area, as is consistent with sufficient strength. Carrier members having 9, 16, 200, 250, 300 and 400 gas flow cells per square inch of end face area are or have been conventionally used in different applications, and carrier members having 600, 800, 1200 or more gas flow channels per square inch of end face area, with wall thicknesses as low as about 1 to 6 mils, are being developed for certain applications. For example, a 1200 channel per square inch carrier made of eg., cordierite or equivalent material would have walls of one or two mils thickness with a nominal width of the channel of, respectively, 0.027 or 0.028 inches. Obviously, any density of channels may be selected for a given purpose. Carriers made of metal, such as stainless steel, by techniques known in the art may provide even more channels per unit area of end face and could benefit from the teachings of the invention, particularly by means of the precoating technique to form fillet portions, as disclosed herein.

Even with relatively large gas flow channels, such as the 230 mil nominal width channels of a 16 gas channel per square inch carrier, the fillet portion provided in accordance with the present invention need not be proportionally increased in size since the deposited thickness of the catalytic coating material usually does not increase in proportion to the increased cell size.

That is, substantially the same range of thickness of catalytic coating material will be deposited on a carrier member having 16 gas flow channels per square inch (about 230 mils nominal width) as is deposited on a carrier member having, say, 400 gas flow channels per square inch (about 43 mils nominal width or more). Accordingly, regardless of cell size, a fillet which subtends at least about 4 mils of the nominal width of the channel wall and is deep enough to extend sufficiently far radially outwardly of the corner as described above, should provide a substantial improvement of uniformity of depth of coating as between the corners and the non-corner portions of the channel walls. On the other hand, a fillet of sufficient depth which subtends more than about 25 mils of even the largest cross section gas flow channel, although within the scope of the invention, would incur the penalty of closing off to gas flow an increasingly larger portion of the end face area, probably without a commensurate further benefit of uniformity of coating depth. For large gas flow channels, a fillet which subtended more than 25 mils might be advantageous, particularly if an unusually heavy catalytic promoting coating is employed. However, for most applications, a fillet which subtends about 4 to 25 mils, preferably about 8 to 16 mils of the nominal width of the gas flow channel wall is preferred. One skilled in the art, upon a reading and understanding of this specification, would be able to readily determine the optimum size of a fillet, depending on the size of the channels and the type and thickness of catalytic coating to be employed.

At the other end of the size scale, there obviously is reached a point at which the gas flow channels are so small that the pressure drop through them is excessive, or the catalytic coating would totally plug the channels. Generally a gas flow channel having a nominal width of at least about 10 mils, preferably at least about 20 mils, appears to be required for most applications.

The filleting of the corners formed by the juncture of channel walls may be accomplished by any suitable manufacturing technique. For example, in the case of refractory monolithic carriers made of porous ceramic-like materials, such as cordierite, the rounded corners are conveniently formed integrally with the carrier by suitable modification of the equipment employed in the manufacturing process. Alternatively, a monolithic carrier member having gas flow channels of conventional polygonal shaped cross section may be coated with a pre-coating material and thereafter dried, the pre-coating material being one which, like the catalytic material supporting coating, will tend to accumulate in the corners to provide a filleted, usually arcuate, corner shape in cross section. After drying, the pre-coated carrier may be calcined to firmly adhere the pre-coating material to the gas flow channel walls. Thereafter, a catalytic promoting coating such as one comprising an activated alumina impregnated with precious metal catalyst, may be applied to the pre-coated carrier.

In the pre-coating technique, advantage is taken of the tendency of coating materials to accumulate in the corners as illustrated in FIGS. 2, 3 and 4 with respect to a catalytic promoting coating material. Use of a pre-coating which does not contain any precious metal or other expensive catalytic-promoting material overcomes the problem of expensive catalytic promoting material, e.g., precious metal catalyst, being buried in corners too deeply under the coating to be effective. Because of practical difficulties involved in obtaining a uniform, evenly-dispersed pre-coating, and the tendency of the precoating to accumulate on the flat portions of the wall as well, unnecessarily thickening them, it is preferred that the carrier material be manufactured with the filleted corners integrally formed as a part thereof. However, an example of the use of a precoating is as follows:

EXAMPLE 1

A precoating material is prepared by placing 400 grams of alpha alumina powder (alundum) of less than 20 mesh size in a ball mill with 800 milliliters of distilled water and 5 milliliters of concentrated nitric acid. The mixture was ball milled for 16 hours at 95 rpm. Nine hundred thirty milliliters of the resulting alpha alumina powder slip weighed 1,263 grams and had a pH of 1.9. A monolithic carrier body 3 inches in length and comprising a 795 body unit, 8 mil wall thickness, 8 corrugations per inch, manufactured by American Lava Company was dipped in the slip for 1 minute, drained and excess slip was blown off with compressed air. The monolith measured 3 inches in length by 3⅝ inches by 3-13/16 inches and was of the type having gas flow channels formed by alternate flat and corrugated strips of ceramic material. The corrugations are rounded at the apices to define a generally sinusoidal profile of the corrugated strip. Accordingly, in cross section the gas flow channels define a nominally equilateral triangular profile, except that the corrugated portions have rounded apices. The monolith was then dried 2 hours in air at 110° C. and thereafter calcined for 2 hours in air at 500° C. The weight of the monolith body prior to dipping into the slip was 388 grams and the weight after the calcination was 403 grams, so that 15 grams of the alpha alumina powder adhered to the monolith body as a precoating.

It was observed that the angular corners initially existing in the monolith were filled by the precoating material which had accumulated therein to provide a concave arcuate profile to the previously sharp angular corners.

Example 1A is the preparation of a catalytic member from the precoated carrier of Example 1 as follows:

EXAMPLE 1A

The precoated carrier of Example 1 was then coated with a catalytically promoting layer comprising gamma alumina stabilized with cerium oxide (10% by weight cerium oxide based on the total of alumina and cerium oxide) and containing platinum and palladium as catalytic promoting metals. The catalytically promoting material was made by placing 400 grams of alumina powder stabilized with ceria into a solution of tetramine platinum dihydroxide and tetramine palladium dihydroxide. The mixture is dried and calcined in a muffle furnace for 1 hour at 500° C. and thereafter the dried powder was placed in a ball mill with 800 milliliters of distilled water and 12 milliliters of concentrated nitric acid and the mixture ball milled 16 hours at 95 rpm. Eight hundred ninety-five milliliters of thus catalyzed slip weighing 1,170 grams were recovered, the slip having a pH of 4.2. The precoated monolith was dipped into the catalyzed slip for 1 minute, removed and excess slip blown off with compressed air. The dipped monolith was dried at 110° C. for 2 hours and thereafter calcined for 2 hours at 500° C.

In a preferred embodiment of the present invention, the filleted corner monolithic carrier has a refractory metal oxide film or coating deposited thereon to provide a discontinuous or, preferably, continuous deposit or coating. The metal oxide coating provides a high surface area support for a catalytic material such as a precious metal catalyst. Preferably, the precious metal catalyst is one or more of platinum group metals. One or more base metals may also be employed in conjunction with the platinum group metals. For example, one or more of manganese, iron, cobalt, nickel and rhenium, preferably nickel in the form of nickel oxide, may be employed as a base metal catalyst. Obviously, the carrier of the invention is utilizable with any appropriate catalytic promoting coating material.

The preferred refractory metal oxide film or coating is one which has a total surface area of at least about 25 square meters per gram of metal oxide coating, preferably at least about 50 or 100 square meters per gram. Such oxides can be prepared by dehydrating, at least partially, and thus activating the hydrate form of a suitable metal oxide by calcination at temperatures of about 150° to 800° C. or even higher. The most preferred active metal oxide film, particularly for applications in the treatment of automotive exhaust gases, is an alumina film predominating in gamma alumina. Such films can be prepared and deposited upon a carrier in accordance with the invention by a number of methods. For example, a hydrous alumina gel can be deposited upon the carrier which is thereafter dried and calcined to expel hydrated water and provide the active gamma alumina. A preferred active refractory metal oxide is obtained by drying and calcining at a temperature between about 150° to 800° C., preferably at a temperature of about 450° C. to 550° C., a carrier coated with a hydrous alumina.

One method of providing the carrier with a coating or film of the refractory metal oxide comprises dipping the monolithic carrier into a solution of the salt of the metal of the refractory oxide and calcining the dipped solution to decompose the deposited metal salt to the metal oxide. This technique generally necessitates several dippings and calcinings in order to obtain a film layer of satisfactory thickness. A preferred method comprises dipping the monolithic carrier into an aqueous suspension, dispersion or slurry of particles of the refractory oxide itself, drying the dipped carrier and calcining it as described above. In this method, suspensions, dispersions or slurries having a solids content of, for example, about 10 to 70% by weight of alumina particles may be employed to deposit a suitable amount of alumina on the carrier in a single application. Preferably, an aqueous dispersion of particles of activated alumina contains about 15 to 50% by weight solids. A preferred technique involves preparing an aqueous suspension, dispersion or slurry of particles of catalytically active alumina and subjecting the mixture to a wet grinding or milling operation to reduce the alumina particles to finely divided form and thereby obtain a thixotropic slip having the desired consistency and solids content as mentioned above. The monolithic carrier is then dipped into the slip, excess slip is blown away with compressed air, the dipped carrier is dried in hot air and then calcined as described above. The calcination may take place in air or may be carried out in contact with other gases or under vacuum conditions. This technique, including calcination at a preferred temperature of between 450° to 550° C., will provide an alumina coating predominating in catalytically-active gamma alumina having a surface area of at least 25 square meters per gram, preferably of at least 100 square meters per gram of alumina. Another method is to employ a solution of the salt of the metal of the refractory oxide which also contains the refractory metal oxide particles.

A catalytically-active metal is dispersed on the alumina support coating thus obtained. For example, one or more platinum group metals, preferably including platinum, provide a catalyst suitable for catalytic oxidation or combustion processes. A combination of one or more platinum group metals with a base metal oxide, such as nickel oxide, provides a catalyst suitable for treatment of automotive exhaust gases to simultaneously reduce nitrogen oxides and oxidize carbon monoxide and hydrocarbons, as disclosed for example, in U.S. Pat. No. 4,157,316, assigned to the assignee of this application. The catalytic metals may be applied by impregnating the refractory metal oxide particles, either before or after their deposition onto the carrier, with an aqueous solution of water soluble compounds of the metals. For example, chlorplatinic acid may be used to impregnate the alumina particles and subsequent calcining and/or reducing steps employed to fix metal platinum onto the alumina. Nickel nitrate may be employed to impregnate the alumina particles with a nickel compound and subsequent calcination used to connect the nitrate to nickel oxide. Alternatively, one or more of the catalytic metals or metal oxides may be added as extremely fine solids particles.

In order to test the relative efficiency in terms of utilization of precious metal catalyst of prior art carrier members employing conventional substantially square cross section shaped flow channels and carrier members employing gas channels having filleted corners in accordance with the present invention, representative samples of catalysts on such carriers were prepared and tested, as follows.

EXAMPLE 2

A catalytic slip material is prepared by placing 505 grams of gamma alumina stabilized with 5 weight percent cerium oxide into a Blakeslee planetary mixer. A solution of $H_2Pt(OH)_6$ dissolved in 36.6 grams of monoethanolamine is adjusted to a volume of 450 cc with distilled water. This solution is added to the powder in the mixer and mixed for five minutes. The total platinum metal added is 6.1 grams.

3.7 grams of $Rh(NO_3)_3$ solution (13.75 weight percent rhodium) is diluted to a final volume of 50 cc with distilled water and this solution is added to the mixer and mixed for an additional 5 minutes. The total rhodium metal added is 0.5 grams.

35 cc of glacial acetic acid is added to the mixer and mixed for an additional 10 minutes. The material is transferred to a Lumard ball mill of the Bacilli type, manufactured by Paul O. Abbe Inc., and having a capacity of 0.5 gallons. 85.7 grams of nickel oxide powder, 1 cc of 2-octanol and 70 cc of distilled water are added to the ball mill and the resultant slurry milled for approximately 17 hours.

The catalytic slip so obtained is removed and shows a viscosity of 59 centipoises, a pH of 4.7 and a percent solids of 45.6 weight percent.

EXAMPLE 3

Two different type monoliths were coated with the catalytic promoting slip obtained in Example 2 as follows. Monolith Type A comprises a cordierite monolith manufactured by NGK Insulators Limited, Nagoya, Japan. The monolith has 400 flow channels per square inch of end face area, channel wall thickness of 6 mils, and the cross section profile of the gas flow channels is square. Monolith Type B comprises a cordierite monolith also made by NGK Insulators Limited, having 400 flow channels per square inch of end face area and a channel wall thickness of 6 mils. Monolith B comprises a carrier body made in accordance with the teachings of the present invention, the flow channels being nominally square in cross section but having filleted corners at the juncture of adjacent channel walls. The filleted corners are, in this embodiment of the invention, rounded corners which comprise arcuate concave profiles having a radius of curvature of eight mils and subtending an angle of about 90°.

One Type A and one Type B monolith were each coated with the catalytic slip obtained from Example 2. Five additional Type B monoliths were dipped in an otherwise identically prepared slip, except that the amount of precious metal component was adjusted to give different precious metal loadings on the catalyst as set forth in Table 1 below. In each case, the monoliths were dipped into the slip and retained therein for two minutes at room temperature. The monoliths were then removed from the slip and allowed to drain and excess slip was blown out with compressed air. The monoliths were then heated in air at 110° C. for about 12 hours. Thereafter, the dried monoliths were calcined at 500° C. for 15 minutes in air. A typical cross section of the Type A monolith is shown in the microphotograph of FIG. 2; of the Type B monolith in FIG. 1B. Specifications of the eight catalytic members thus obtained are as follows:

TABLE 1

| | Test Monolithic Catalyst Members | | | | | |
|---|---|---|---|---|---|---|
| | | | Precious Metal Loading, g/ft³ of piece | | | Catalytic Coating |
| Piece No. | Control No. | Monolith Type | Target | Based on XRF* | Based on AC** | Loading g/m³ of piece |
| (1) | 10987-28-15 | A | 40 | 37.1 | 40.3 | 2.07 |
| (2) | 10987-28-17 | B | 40 | 39.7 | 40.3 | 2.07 |
| (3) | 10987-30-11 | B | 35 | 34.5 | 34.1 | 2.00 |
| (4) | 10987-29-1 | B | 30 | 33.3 | 31.8 | 2.18 |
| (5) | 10987-31-24 | B | 25 | 21.8 | 23.2 | 1.90 |
| (6) | 10987-32-23 | B | 20 | 27.9 | 19.6 | 2.01 |
| (7) | 11043-22-1 | B | 15 | 15.7 | 14.9 | 2.03 |
| (8) | 10987-29-2 | B | 30 | 26.1 | 28.7 | 1.96 |

*XRF = as measured by x-ray fluorescence analysis of the coated monoliths
**AC = as calculated from measured weight of deposited coating and its calculated content of precious metal Each piece has a target loading of 0.3 g/m³ of piece of nickel oxide, calculated as NiO, and its precious metal is platinum and rhodium in a weight ratio of 12:1 platinum to rhodium. Each piece is cylindrical in shape, having circular end faces of 9.1 centimeters diameter and is 7.6 centimeters long.

The catalyst members of Table 1 are particularly adapted to be used for so-called three way conversion of pollutants in automotive engine exhausts, i.e., for simultaneous oxidation of hydrocarbons and carbon monoxide and reduction of nitrogen oxides.

Engine dynamoneter tests were carried out on the test pieces of Table 1 after they were aged, as described below, and the test results indicate that the precious metal loadings can be decreased on monoliths having filleted corners in accordance with the present invention without lowering the three way catalytic oxidation and reduction activity relative to that obtained for otherwise equivalent monoliths having gas flow channels of the conventional square cross section. It should be noted that a precious metal loading of about 40 g/ft$^3$ of catalyst piece is conventional practice in the field of automotive exhaust gas catalytic devices. Since it is obviously economically desirable to minimize the amount of precious metal employed, it may be taken as the consensus that a 40 g/ft$^3$ loading of precious metal represents about the minimum precious metal loading effective to attain this requisite level of conversion. Pieces numbers 1–8 of Table 1 were aged by having an engine exhaust gas passed through them for fifty of the three mode aging cycles described in Table II following.

TABLE II

Three-Mode Variable Aging Cycle

| Mode | Time, Min. | Catalyst Inlet Temperature, °C. | Simulated Speed Miles/Hour |
|---|---|---|---|
| Idle | 15 | 216 ± 28 | 0 |
| High Temperature | 20 | 704 ± 28 | 55 |
| Intermediate Temperature | 205 | 538 ° 17 | 40 |

Fifty of the cycles of Table II provide 200 hours of operation, equivalent to 7,454 miles of engine operation. After aging, the catalysts were utilized to treat engine exhaust gas and typical conversion data obtained from an eight chamber reactor attached to the engine exhaust stream are given in Table III following.

TABLE III

| Air to Fuel (A/F) Ratio, A/F | Typical Conversion Data At 480° C., 80,000 VHSV, ± 0.3 A/F at 1 HZ % Conversion of Pollutants* | | | | | | | | |
|---|---|---|---|---|---|---|---|---|---|
| | HC | | | CO | | | NOx | | |
| | 14.55 | 14.65 | 14.75 | 14.55 | 14.65 | 14.75 | 14.55 | 14.65 | 14.75 |
| Piece No 1 | 60 | 84 | 94 | 39 | 78 | 100 | 88 | 96 | 70 |
| Piece No 2 | 62 | 86 | 94 | 38 | 82 | 100 | 89 | 96 | 72 |
| Piece No 3 | 60 | 88 | 93 | 40 | 80 | 100 | 90 | 96 | 76 |
| Piece No 4 | 65 | 88 | 93 | 40 | 82 | 100 | 91 | 96 | 75 |
| Piece No 5 | 64 | 87 | 93 | 35 | 82 | 100 | 90 | 94 | 77 |
| Piece No 6 | 62 | 86 | 94 | 43 | 82 | 100 | 88 | 96 | 72 |
| Piece No 7 | 64 | 90 | 94 | 34 | 80 | 100 | 89 | 94 | 71 |
| Piece No 8 | 60 | 88 | 94 | 40 | 80 | 100 | 88 | 96 | 72 |

*Percent of initial content of component which is oxidized (CO and HC) or reduced (NO$_x$) to innocuous form (CO$_2$, H$_2$O and N$_2$)

A comparison of the percent conversion of total specified pollutants in the exhaust stream prior to contacting the catalyst for the different pieces, indicates that for the catalytic members having the filleted corner gas flow channels in accordance with one embodiment of the present invention, the activity level is practically independent of the large range of precious metal loadings evaluated. The comparison data for pieces 1 and 2 shows that the performance of equivalent precious metal loaded catalysts as between the conventional prior art type of piece 1 and the embodiment of the invention provided by piece 2, gives substantially equivalent performance. At the target loading of 40 g/ft$^3$ of catalyst member, the filleted corner monoliths in accordance with one embodiment of the present invention provided conversions which were higher by 0 to about 3% as compared to the conventional member provided by piece number 1.

In another test, four catalyst pieces having the Type A monolith carrier of Example 3 were coated exactly as described in Example 3 to provide a target loading of 40 grams of previous metal per cubic foot of catalyst member. Four monoliths of Type B as described in Example 3 were otherwise identically coated except that the quantity of precious metal compound in the catalytic slip was reduced to provide a target loading of 32 g/ft$^3$ of catalytic member. These eight catalyst pieces were aged for 45 of the 3 mode aging cycles described in Table II, to provide a catalyst of 180 hours aging, the equivalent to 6,741 miles of engine operation. After aging, the catalyst were testing to compare their respective performances at three different air to fuel ratios. Despite the significantly lower loading of precious metal on the four catalyst members representing an embodiment of the present invention, it is seen from the data of Table IV following that substantially comparable performance is attained.

TABLE IV

| Direct Comparison of TWC Activity | | | | | | | | | |
|---|---|---|---|---|---|---|---|---|---|
| Engine Aged, Miles/Hours | | | | 6741/180 | | | | | |
| Temperature, °C. | | | | 482 | | | | | |
| Space Velocity, VHSV | | | | 80,000 | | | | | |
| A/F Perturbations, A/F | | | | ±0.3 AT 1 HZ. | | | | | |
| Precious Metal Loading, Grams/Ft$^3$ | | | | | | | | | |
| Square Corners | | | | 40 | | | | | |
| Filleted Corners | | | | 32 | | | | | |
| A/F Ratio, A/F | | 14.55 | | | 14.65 | | | 14.75 | |
| Conversion, % Square Corners (Prior Art) | HC | CO | NOx | HC | CO | NO | HC | CO | NOx |
| Average | 52.0 | 50.0 | 80.8 | 75.5 | 70.0 | 92.5 | 90.8 | 94.0 | 88.5 |
| Std. Deviation | 1.8 | 0 | 4.6 | 1.7 | 0.8 | 1.3 | 3.9 | 3.6 | 1.9 |
| Filleted Corners | | | | | | | | | |
| Average | 50.5 | 50.0 | 78.5 | 73.3 | 70.0 | 94.3 | 90.0 | 94.3 | 88.5 |
| Std. Deviation | 0.6 | 0 | 5.1 | 2.9 | 0.8 | 2.6 | 2.9 | 2.6 | 1.3 |

Averages based on four TWC catalyst cores for both types of monoliths.

Light-off tests were conducted in a laboratory adiabatic reactor to compare the performance of filleted and non-filleted monolithic carriers otherwise identical and loaded with varying quantities of precious metal. A light-off test measures the lowest temperature at which a specified percentage of the original content of each of the pollutants is converted. Generally, light-off temperatures decrease as precious metal loadings increase for both the filleted and nonfilleted monoliths. In general, the light-off performance of the filleted and nonfilleted monoliths was similar, even the bulk density and open flow areas of the filleted monoliths are different for the filleted as compared to the nonfilleted monoliths. The results of the light-off temperature comparisons are given in Table V below.

TABLE V

Comparison of Light-off Temperatures

| No. | Cell Geometry | PM Loading | Light-Off Temperatures (°F.) For Conversion* Of | | | | | | | |
|---|---|---|---|---|---|---|---|---|---|---|
| | | | CO | | | | HC | | | |
| | | | 25% | 50% | 75% | 90% | 25% | 50% | 75% | 90% |
| 10987-28-15 | Square | 40g/ft$^3$ | 465 | 485 | 505 | 525 | 450 | 475 | 510 | 635 |
| 10987-28-17 | Filleted | 40 | 460 | 480 | 500 | 525 | 465 | 485 | 530 | 630 |
| 10987-30-11 | " | 35 | 465 | 485 | 510 | 530 | 475 | 500 | 530 | 670 |
| 10987-29-1 | " | 30 | 480 | 495 | 510 | 530 | 480 | 500 | 535 | 675 |
| 10987-31-24 | " | 25 | 485 | 500 | 520 | 545 | 490 | 510 | 555 | 710 |
| 10987-32-23 | " | 20 | 480 | 495 | 520 | 540 | 485 | 505 | 550 | 685 |
| 11043-22-1 | " | 15 | 490 | 510 | 530 | 550 | 500 | 520 | 565 | 700 |
| 10987-29-2 | " | 30 | 480 | 495 | 510 | 530 | 485 | 500 | 540 | 680 |

Notes
1. All catalysts comprise monolithic cylindrical carriers of ½ inch diameter × 3 inches long and were aged 6541 miles on engine-dynamometer before evaluation of light-off activity.
2. Gas flow rate (VHSV) = 40,000 hr$^{-1}$
3. Gas composition was $O_2$ = 3.0%, HC = 300 ppm, (240 ppm propylene and 60 ppm propane*) $H_2O$ = 10%, CO = 0.8%, $H_2$ = 0.27%, NO = 500 ppm, $CO_2$ = 10%, $N_2$ balance. All gas compositions are volume percent.
4. Conversion* is expressed as percent of initial content of component which is oxidized to innocuous form ($CO_2$ and/or $H_2O$).

The data and the tables indicate that monolithic catalytic bodies in accordance with the invention provide an equivalent effectiveness in removing the three primary pollutants of automotive engine exhaust comparable to those of conventional catalyst which have a significantly higher precious metal loading. Generally, when the carrier member is made in accordance with the present invention to have a filleted configuration at the juncture of adjanct channel walls, precious metal loadings can be reduced by at least about 20% as compared to an otherwise equivalent conventional carrier member, while obtaining equivalent catalyst activity.

A similar comparison was made with catalysts in which the precious metal loadings were decreased by 50% on the carrier members having filleted corners in accordance with the invention as compared to the precious metal deposited on conventional carrier members, i.e., respective metal loadings of 20 g/ft$^3$ and 40 g/ft$^3$ of precious metal. Carbon monoxide and hydrocarbon oxidation activity was substantially the same for both types tested, notwithstanding the use of 50% less precious metal on the carriers in accordance with the invention. Nitrogen oxide reduction activity of these (50% reduction in precious metals) carriers in accordance with the invention was decreased only by about 2-11%, depending on the air/fuel ratio employed, as compared to the much heavier loaded conventional carrier.

A catalyst monolith prepared in accordance with the precoating technique of Example 1 and impregnated with precious metal catalyst in accordance with the technique of Example 1A was prepared and tested against an otherwise identical monolith made in accordance with the prior art teachings, i.e., without the precoating step and having a higher concentration of precious metal catalyst. Both catalysts were platinum and palladium catalysts supported on a ceria stabilized alumina coating. The prior art embodiments comprised 0.03 weight percent platinum and 0.015 weight percent palladium. The precoating embodiment in accordance with the invention had 0.017 weight percent platinum and 0.008 percent palladium. Despite the significantly lower precious metal content, the precoated catalyst showed comparable performance, and actually performed better with respect to carbon monoxide oxidation.

It is apparent that the carrier body configuration in accordance with the present invention permits a remarkable reduction in the amount of precious metal deposited on the carrier member while obtaining equivalent catalyst effectiveness for both oxidation and reduction reactions. This appears to bear out applicants theory, although applicant does not wish to be bound thereby, that the filleted configuration of the juncture of adjacent channel walls prevents the "burying" of catalytic material too deeply to be effective in connection with treating gases (or liquids) flowed through the flow channels.

Six is the greatest number of sides a polygonal geometric figure can have and still be capable of being arranged in a repeating, continuous honeycomb-like pattern without "dead space", i.e., space not enclosed by a single figure, being formed. Accordingly, since it is desired normally to provide the maximum amount of open flow area per unit area of carrier end face, the nominally polygonal cross section profiles of the gas flow channels employed in the art have 3, 4 or 6 sides, and are either isosceles or equilateral triangular, rectangular (which includes square) or hexagonal in cross section profile. Accordingly, the maximum angle of incidence between adjacent gas flow channel walls of the prior art structures is 120°, as indicated in Table A. The fillet portions in accordance with one aspect of the present invention, preferably increase this angle of incidence to greater than 120° up to and including a tangential incidence between the fillet portion and the adjacent channel walls which is to be considered as a 180° angle of incidence (not 0°) for purposes of the description in this application.

While the invention has been described with respect to specific preferred embodiments thereof, it will be apparent to those skilled in the art upon a reading and understanding of the foregoing that the invention is not limited to the specific embodiments illustrated but is generally applicable to monolithic carrier bodies adapted for the deposition of a coating catalytic promoting material thereon.

What is claimed is:

1. In a carrier member adapted to have a catalytic promoting material deposited as a coating thereon and comprising a monolithic body having opposite end faces, a plurality of fluid flow channels extending through said body from one of said end faces to the other to provide fluid flow communication through said body, said channels being formed by channel walls dimensioned and configured to define along their length a nominally polygonal shaped cross section profile of said channels, the improvement comprising that the juncture of adjacent walls within said channels are formed by fillet portions of said walls, said fillet portions extending along the length of said channels and defining in cross section concave profiles of a depth sufficient to extend at least to the midpoint of a segment of a circle taken as disposed tangentially with respect to the two channel walls whose juncture is provided by said fillet and which segment subtends between about 1.5% to 40% of the nominal width of each of the two channel walls adjacent to said juncture.

2. The carrier member of claim 1 wherein the circle is taken as one which subtends between about 5–25% of the nominal width of each of the two channel walls.

3. In a carrier member adapted to have a catalytic promoting material disposed as a coating thereon and comprising a monolithic body having opposite end faces, a plurality of fluid flow channels extending through said body from one of said end faces to the other to provide fluid flow communication through said body, the improvement comprising that said channels are formed by channel walls dimensioned and configured so as to define along their length a central flat planar portion bounded on its opposite sides by fillet portions which form the juncture of adjacent walls within said channels, said fillet portions defining in cross section concave profiles large enough whereby when said body is coated with one or more of a refractory metal oxide precursor and a refractory metal oxide in particulate form deposited from a liquid medium containing the same flowed through said channels and said body is heated to expel said liquid medium and to form a coating of said refractory metal oxide on said channel walls, said metal oxide coating is deposited to a substantially uniform average depth on both said flat planar and said fillet portions of said walls.

4. The carrier member of claim 1 or claim 3 wherein said fillet portions define in cross section arcuate profiles.

5. The carrier member of claim 1 or claim 3 wherein the concave profiles of said fillet portions have the shape of substantially circular segments.

6. The carrier member of claim 5 wherein the concave profiles of said fillet portions have a radius of curvature of from about four to twenty-five mils.

7. The carrier member of claim 1 or claim 3 wherein the concave profiles of said fillet portions merge tangentially into said channel walls.

8. The carrier member of claim 1 or claim 3 wherein said channel walls have a nominal width of about 20 to 280 mils and said fillet portions subtend about five to forty percent of the nominal width of each of said two channel walls.

9. The carrier member of claim 1 or claim 3 wherein the concave profiles of said fillet portions subtend from about eight to sixteen mils of the nominal width of each of the two channel walls.

10. A catalyst comprising a monolithic body having opposite end faces, a plurality of fluid flow channels extending through said body from one of said end faces to the other to provide fluid flow communication through said body, said channels being formed by channel walls dimensioned and configured to define along their length a nominally polygonal shaped cross section profile of said channels, the improvement comprising that the juncture of adjacent walls within said channels are formed by fillet portions of said walls, said fillet portions extending along the length of said channels and defining in cross section concave profiles of a depth sufficient to extend at least to the midpoint of a segment of a circle taken as disposed tangentially with respect to the two channel walls whose juncture is provided by said fillet, which segment subtends between about 1.5% to 40% of the nominal width of each of the two channel walls adjacent to said juncture, and a catalytically active component disposed as a coating on said channel walls.

11. The carrier member of claim 9 wherein said catalytically active component comprises a refractory metal oxide containing one or more of a catalytically active metal.

12. The carrier member of claim 11 wherein said catalytically active component comprises alumina containing thereon one or more of a platinum group metal and, optionally, one or more of a base metal.

13. The carrier member of claim 1 or claim 3 wherein said body is comprised of a material selected from the class consisting of zircon-mullite, alpha alumina, sillimanite, magnesium silicate, zircon, petalite, spodumene, cordierite, alumino-silicate and mullite.

14. The carrier member of claim 1 or claim 3 wherein said fillet portions are an integral part of said body.

15. The carrier member of claim 1 or claim 3 wherein said flow channels have a nominally polygonal cross section profile shape selected from the class consisting of isosceles triangles, equilateral triangles, rectangles and hexagons.

16. A method of making a catalytic member comprising the steps of:
(a) forming, in a monolithic body having opposite end faces, a plurality of fluid flow channels extending through said body from one of said end faces to the other and being dimensioned and configured to define along their length a nominally polygonal shaped cross section profile of said channels, the juncture of adjacent walls within said channels being formed by fillet portions extending along the length of said channels and defining in cross section concave profiles which subtend a length of at least about four mils of the cross section nominal width of each of the two channel walls adjacent thereto and which are of a depth sufficient to extend at least to the midpoint of a segment of a circle taken as disposed tangentially with respect to said two channel walls adjacent thereto;

(b) contacting said body with a liquid medium containing one or more of a refractory metal oxide precursor and a refractory metal oxide in particulate form and depositing the same on said channel walls; and (c) heating said body to expel said aqueous medium and form on said channel walls a coating of a refractory metal oxide having a substantially uniform average depth on both said fillet portions and other portions of said channel walls.

17. A method of making a catalytic member comprising the steps of:

(a) forming, in a monolithic body having opposite end faces, a plurality of fluid flow channels extending through said body from one of said end faces to the other and being dimensioned and configured to define along their length a central flat planar portion bounded on its opposite sides by fillet portions which form the juncture of adjacent walls within said channels and define in cross section concave profiles;

(b) contacting said body with a liquid medium containing one or more of a refractory metal oxide precursor and a refractory metal oxide in particulate form and depositing the same on said channel walls; and (c) heating said body to expel said liquid medium and form a coating of a refractory metal oxide on said channel walls, said fillet portions being large enough so that said coating of refractory metal oxide is formed to a substantially uniform average depth on both said flat planar and said fillet portions of said walls.

18. The method of claim 14 or claim 15 wherein said liquid medium is an aqueous medium.

19. The method of claim 16 or claim 17 including forming said fillet portions so that they define arcuate profiles in cross section.

20. The method of claim 16 or claim 17 including forming said fillet portions so that they define in cross section profiles of substantially circular segments having a radius of curvature of from about four to twenty-five mils.

21. The method of claim 16 or claim 17 including forming said concave profiles to subtend a length of at least about eight mils.

22. The method of claim 16 or claim 17 wherein said heating includes the step of calcining at a temperature of between about 250° C. to 800° C.

23. The method of claim 16 or claim 17 including forming said fillet portions integrally with said body.

24. The method of claim 16 or claim 17 wherein said refractory metal oxide is alumina.

25. The method of claim 16 or claim 17 including the additional step of depositing a catalytic promoting metal on said refractory metal oxide.

26. The method of claim 25 wherein the catalytic promoting metal is one or more of a platinum group metal and, optionally, one or more of a base metal.

27. A catalyst having a catalytic promoting material comprising a refractory metal oxide obtained as defined below disposed as a coating on a monolithic body, said monolithic body having opposite end faces and a plurality of fluid flow channels extending therethrough from one of said end faces to the other to provide fluid flow communication through said body, the improvement comprising that said channels are formed by channel walls dimensioned and configured so as to define along their length a central flat planar portion bounded on its opposite sides by fillet portions which form the juncture of adjacent walls within said channels, said fillet portions defining in cross section concave profiles and said metal oxide coating having a substantially uniform average depth on both said flat planar and said fillet portions of said walls.

28. The catalyst of claim 10 or claim 27 wherein said fillet portions define in cross section arcuate profiles.

29. The catalyst of claim 10 or claim 27 wherein the concave profiles of said fillet portions have the shape of substantially circular segments.

30. The catalyst of claim 10 of claim 27 wherein the concave profiles of said fillet portions merge tangentially into said channel walls.

31. The catalyst of claim 10 or claim 27 wherein said channel walls have a nominal width of about 20 to 280 mils and said fillet portions subtend about five to forty percent of the nominal width of each of said two channel walls.

32. The catalyst of claim 10 of claim 27 wherein said body is comprised of a material selected from the class consisting of zircon-mullite, alpha alumina, sillimanite, magnesium silicate, zircon, petalite, spodumene, cordierite, alumino-silicate and mullite and said refractory metal oxide coating contains a catalytically active metal comprising one or more of a platinum group metal.

* * * * *